United States Patent
Takai (10) Patent No.: US 10,585,577 B2
(45) Date of Patent: Mar. 10, 2020

(54) DISPLAY DEVICE AND COMPUTER-READABLE NON-TRANSITORY RECORDING MEDIUM RECORDING DISPLAY CONTROL PROGRAM

(71) Applicant: KYOCERA Document Solutions Inc., Osaka (JP)

(72) Inventor: Kenji Takai, Osaka (JP)

(73) Assignee: KYOCERA Document Solutions, Inc., Tamatsukuri, Chuo-ku, Osaka (JP)

( * ) Notice: Subject to any disclaimer, the term of this patent is extended or adjusted under 35 U.S.C. 154(b) by 354 days.

(21) Appl. No.: 15/613,772

(22) Filed: Jun. 5, 2017

(65) Prior Publication Data

US 2017/0364228 A1 Dec. 21, 2017

(30) Foreign Application Priority Data

Jun. 20, 2016 (JP) .................... 2016-121768

(51) Int. Cl.
*G06F 3/0485* (2013.01)
*G06F 3/0482* (2013.01)
*G06F 3/0488* (2013.01)

(52) U.S. Cl.
CPC .......... *G06F 3/0485* (2013.01); *G06F 3/0482* (2013.01); *G06F 3/0488* (2013.01)

(58) Field of Classification Search
None
See application file for complete search history.

(56) References Cited

U.S. PATENT DOCUMENTS

| 5,844,547 | A | 12/1998 | Minakuchi et al. | |
|---|---|---|---|---|
| 7,345,675 | B1 | 3/2008 | Minakuchi et al. | |
| 2008/0092078 | A1* | 4/2008 | Takeshima | G06F 3/0485 715/786 |
| 2011/0090255 | A1* | 4/2011 | Wilson | G06F 3/04817 345/647 |
| 2012/0174005 | A1* | 7/2012 | Deutsch | G06F 3/04817 715/764 |

(Continued)

FOREIGN PATENT DOCUMENTS

| JP | H05-100809 A | 4/1993 |
|---|---|---|
| JP | H10-161628 A | 6/1998 |

(Continued)

*Primary Examiner* — Nhat Huy T Nguyen
(74) *Attorney, Agent, or Firm* — IP Business Solutions, LLC (57) ABSTRACT

A display device with a display section and a control unit including a processor, the processor performing operation in accordance with an operation program and the control unit performing control of: receiving an instruction based on touch operation on the display section; storing a list; storing use information; updating the stored use information; and allowing the display section to display the stored list upon reception of an instruction for displaying the list and performing scroll display of the list upon reception of a scroll instruction and in a case where the list is a scroll image. The control unit detects, as priority information, information highest in a use frequency out of the information listed in a scroll direction from a start position of the scroll display, and ends the scroll display while displaying the priority information at a predefined position in a display region of the display section.

8 Claims, 11 Drawing Sheets

(56) References Cited

U.S. PATENT DOCUMENTS

| | | | | |
|---|---|---|---|---|
| 2013/0111396 A1* | 5/2013 | Brid | ..................... | G06F 3/0485 |
| | | | | 715/784 |
| 2014/0258922 A1* | 9/2014 | Lee | .................... | G06F 3/04855 |
| | | | | 715/786 |
| 2015/0116218 A1* | 4/2015 | Yang | ..................... | G06F 21/31 |
| | | | | 345/158 |

FOREIGN PATENT DOCUMENTS

| JP | 2009-047809 A | 3/2009 |
|---|---|---|
| JP | 2013-114338 A | 6/2013 |

\* cited by examiner

| CONTACT DETAILS | NUMBER OF TIMES OF USE |
|---|---|
| A | 5 |
| B | 4 |
| C | 1 2 |
| D | 3 |
| E | 2 |
| F | 1 7 |
| G | 4 |
| H | 1 1 |
| I | 8 |
| J | 2 3 |
| K | 7 |
| L | 7 |
| M | 1 2 |
| N | 4 |
| O | 2 |
| P | 6 |
| Q | 1 9 |
| R | 5 |
| S | 8 |
| T | 1 2 |
| U | 1 6 |
| V | 4 |
| W | 5 |
| X | 3 |
| Y | 1 0 |
| Z | 9 |

| DESTINATION NAME | NUMBER OF TIMES OF USE | |
|---|---|---|
| | MAIL PURPOSE | TELEPHONE PURPOSE |
| A | 2 | 3 |
| B | 3 | 1 |
| C | 9 | 3 |
| D | 2 | 1 |
| E | 2 | 0 |
| F | 10 | 7 |
| G | 2 | 2 |
| H | 4 | 7 |
| I | 5 | 3 |
| J | 8 | 15 |
| K | 2 | 5 |
| L | 5 | 2 |
| M | 11 | 1 |
| N | 3 | 1 |
| O | 0 | 2 |
| P | 2 | 4 |
| Q | 2 | 17 |
| R | 3 | 2 |
| S | 5 | 3 |
| T | 7 | 5 |
| U | 15 | 1 |
| V | 3 | 1 |
| W | 1 | 4 |
| X | 2 | 1 |
| Y | 5 | 5 |
| Z | 3 | 6 |

DISPLAY DEVICE AND COMPUTER-READABLE NON-TRANSITORY RECORDING MEDIUM RECORDING DISPLAY CONTROL PROGRAM

INCORPORATION BY REFERENCE

This application claims priority to Japanese Patent Application No. 2016-121768 filed on 20 Jun. 2016, the entire contents of which are incorporated by reference herein.

BACKGROUND

This disclosure relates to a display device and a computer-readable non-transitory recording medium recording a display control program and more specifically to a technology of performing scroll display of an image displayed at a display section.

Mobile devices such as portable phones, smartphones, personal digital assistants (PDAs), music players, and electronic tablets have been widespread in recent years. Some display devices of the mobile devices or the like perform, in accordance with user's touch operation performed on a display screen displayed at a display section, scroll display of the display screen.

Some display devices are loaded with a function called inertia scroll which, upon scroll display of a display screen in accordance with swipe operation (operation of sliding a finger with the finger kept in touch with the screen), gradually attenuates a scroll speed as if inertia is in action without ending the scroll display immediately after separation of a user's finger from the display screen.

SUMMARY

As one aspect of this disclosure, a technology obtained by further improving the technology described above will be suggested.

A display device according to one aspect of this disclosure includes a display section and a control unit. The display section includes a touch panel function. The control unit includes a processor, and as a result of performing operation in accordance with an operation program by the processor, performs: control of receiving an instruction based on touch operation on the display section detected by the touch panel function; control of storing a list for listing a plurality of pieces of information as a display screen at the display section; control of storing use information indicating a use frequency for each of the plurality of pieces of information; control of updating the stored use information; and control of allowing the display section to display the stored list upon reception of an instruction for displaying the list and control of performing scroll display of the list upon reception of a scroll instruction and in a case where the list is a scroll image displayed at the display section with the scroll display. The control unit detects, as priority information, information highest in the use frequency, indicated by the use information, out of the plurality of pieces of information listed in the list in a scroll direction from a start position of the scroll display, and ends the scroll display while displaying the priority information at a predefined position in a display region of the display section.

A computer-readable non-transitory recording medium according to another aspect of this disclosure includes a display control program causing a computer to function as a control section performing: control of receiving an instruction based on touch operation on a display section detected by a touch panel function included in the display section; control of storing a list for listing a plurality of pieces of information as a display screen at the display section; control of storing use information indicating a use frequency for each of the plurality of pieces of information; control of updating the stored use information; and control of allowing the display section to display the stored list upon reception of an instruction for displaying the list and control of performing scroll display of the list upon reception of a scroll instruction and in a case where the list is a scroll image displayed at the display section with the scroll display. The display control program further causes the computer to function in a manner such that the control section detects, as priority information, information highest in the use frequency, indicated by the use information, out of the plurality of pieces of information listed in the list in a scroll direction from a start position of the scroll display, and ends the scroll display while displaying the priority information at a predefined position in a display region of the display section.

DETAILED DESCRIPTION

Figure 1:
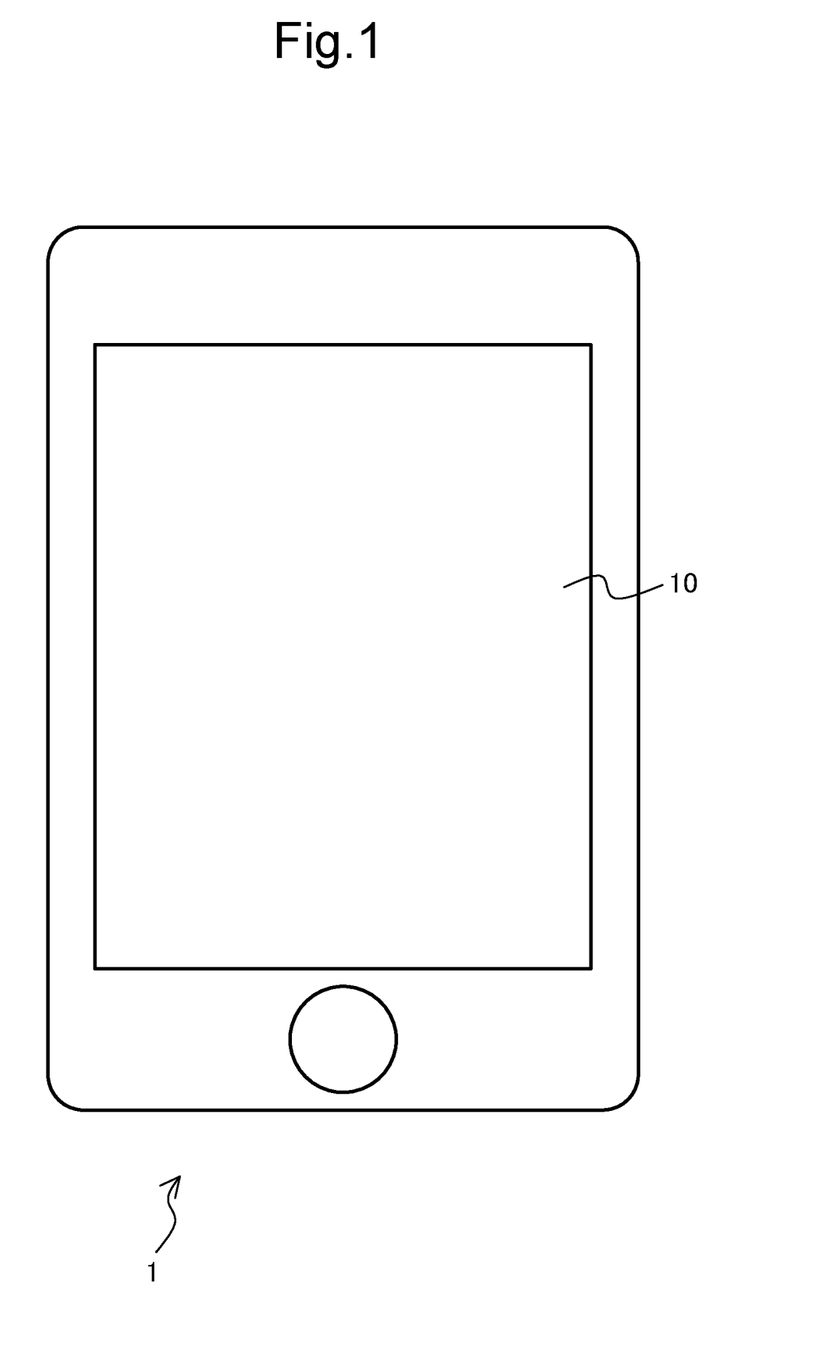
FIG. 1 is a plan view illustrating outer appearance of a display device according to a first embodiment of this disclosure.
Figure 2:
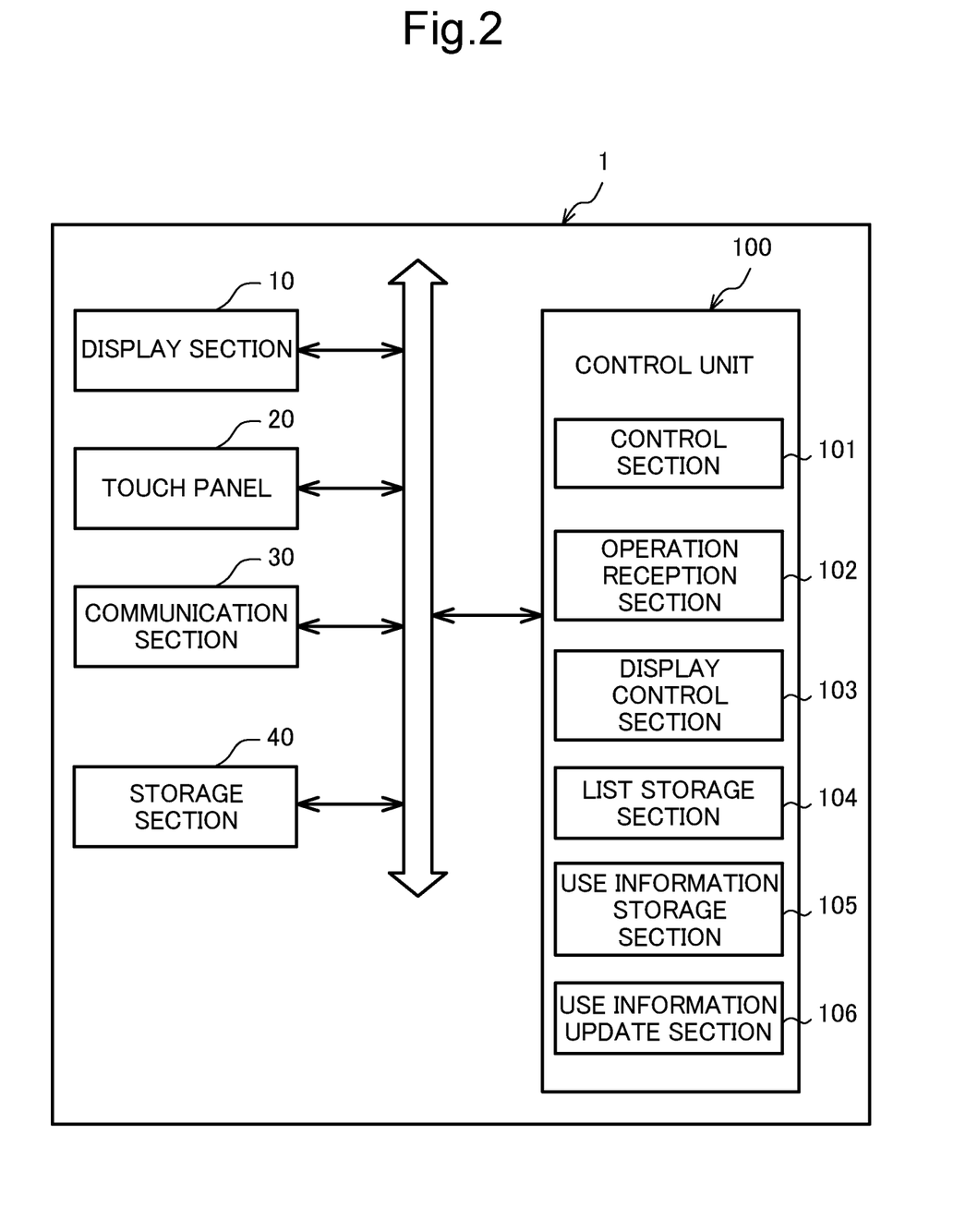
FIG. 2 is a functional block diagram schematically illustrating main inner configuration of the display device according to the first embodiment.

Hereinafter, a display device and a display control program according to one embodiment of this disclosure will be described with reference to the drawings. FIG. 1 is a plan view illustrating outer appearance of the display device according to a first embodiment of this disclosure. FIG. 2 is a functional block diagram schematically illustrating main inner configuration of the display device according to the first embodiment.

The display device 1 according to one embodiment of this disclosure is, for example, a mobile device such as a smartphone, and includes a display section 10, a touch panel 20, a communication section 30, a storage section 40, and a control unit 100. Each of these structures is capable of performing data or signal transmission and reception to and from each other via a central processing unit (CPU) bus.

The display section 10 is composed of, for example, a liquid crystal display (LCD) or an organic light-emitting diode (OLED). The display section 10 displays, for example, response and data results from the control unit 100.

The touch panel 20 is a touch panel of, for example, a so-called resistance film type or capacitance type. The touch panel 20 is arranged on a front surface of the display section 10, and detects user's contact with a display screen, which is displayed by the display section 10, together with a position of the contact. Upon the detection of the user's contact, the touch panel 20 outputs a detection signal indicating a coordinate position of a point of the contact to, for example, an operation reception section 102, to be described later on, of the control unit 100. As described above, the touch panel 20 plays a role as an operation section into which user operation on the display screen displayed by the display section 10 is inputted.

Note that the touch panel 20 includes a touch panel which detects user's finger or the like upon approach of the finger to the display screen at a given distance even without direct contact thereof with the display screen. Thus, "contact" in this embodiment includes, as substantial contact, even a state in which the contact of the finger or the like with the display screen at the aforementioned given distance even without the contact thereof with the display screen is detected by a function of the touch panel 20.

The display device 1 may also include, as an operation section into which user operation is inputted, physical keys in addition to the aforementioned touch panel 20. The physical keys include, for example, arrow keys, a Page Up key, a Page Down key, etc.

The communication section 30 is a communication interface including a communication module such as a local area network (LAN), not illustrated. The display device 1 is connected to another electronic device such as a personal computer (PC) via the network, and performs data transmission and reception to and from, for example, the connected PC by the communication section 30.

The storage section 40 is a storage device such as a nonvolatile memory.

The control unit 100 is composed of a processor, a random access memory (RAM), a read only memory (ROM), etc. The processor is, for example, a CPU, an MPU, or an ASIC. As a result of execution of the display control program stored in the storage section 40 by the processor, the control unit 100 functions as a control section 101, the operation reception section 102, a display control section 103, a list storage section 104, a use information storage section 105, and a use information update section 106. Note that, however, each of the aforementioned structures of the control unit 100 may be formed by a hard circuit without depending on operation based on the display control program. Hereinafter, unless otherwise is specified, the same applies to each of the embodiments.

The control section 101 is in charge of overall operation control of the display device 1. The control section 101 is connected to the display section 10, the touch panel 20, the communication section 30, the storage section 40, etc., and performs operation control of each of the aforementioned connected structures and signal or data transmission and reception between the structures. For example, the control section 101 includes a mail function, and performs mail transmission and reception and stores transmitted mail information and received mail information into the use information storage section 105. The control section 101 includes, for example, a mail function and a telephone function, and realizes mail transmission and reception and a telephone call.

The operation reception section 102 receives touch operation on the display section 10 detected by the touch panel 20. Based on a detection signal outputted from the touch panel 20, the operation reception section 102 identifies details of the touch operation performed by a user and outputs an instruction corresponding to the identified details to the control section 101, the display control section 103, etc.

The touch operation performed on the touch panel 20 includes, for example, tap operation and slide operation (including flick operation and swipe operation). For example, upon contact of the user's finger with the touch panel 20 followed by separation of the finger from a position of the contact, the touch panel 20 outputs, to the operation reception section 102, a detection signal indicating the position where the contact has been detected. The operation reception section 102 receives the detection signal and, for example, identifies that the user operation inputted by the user is tap operation.

Upon movement of the finger being in contact with the touch panel 20, the touch panel 20 outputs, to the operation reception section 102, a detection signal indicating each of movement positions from an initial position where the contact has first been detected to a final position where the contact has finally been detected. The operation reception section 102 receives the detection signal and identifies that the user operation inputted by the user is the slide operation (the flick operation or the swipe operation).

The display control section 103 performs display control of the display section 10. For example, upon reception of an address book display instruction (one example of the display instruction of a list) from the user by the operation reception section 102, the display control section 103 reads out a list from the list storage section 104 and allows the display section 10 to display the read list.

Moreover, upon identification by the operation reception section 102 that the touch operation performed by the user is, for example, swipe operation or flick operation, the display control section 103 performs scroll display (inertia scroll) which gradually decelerates, for example, a scroll speed in accordance with a direction and a speed of the swipe operation. The operation reception section 102 detects the direction of the swipe operation based on a moving direction of the finger in contact with the touch panel 20, and detects the speed of the swipe operation based on a moving distance of the finger per unit time. Note that the description below refers to, as an example, a case where the swipe operation is received, but this disclosure may refer to each control performed by the operation reception section 102 and the display control section 103 based on, for example, another touch operation such as the flick operation.

The list storage section 104 stores a list for listing a plurality of pieces of information (for example, contact information, and the description below refers to the contact information as an example) as a display screen at the display section 10 and attribute information (for example, mail addresses and telephone numbers) of the list.

Figure 3:
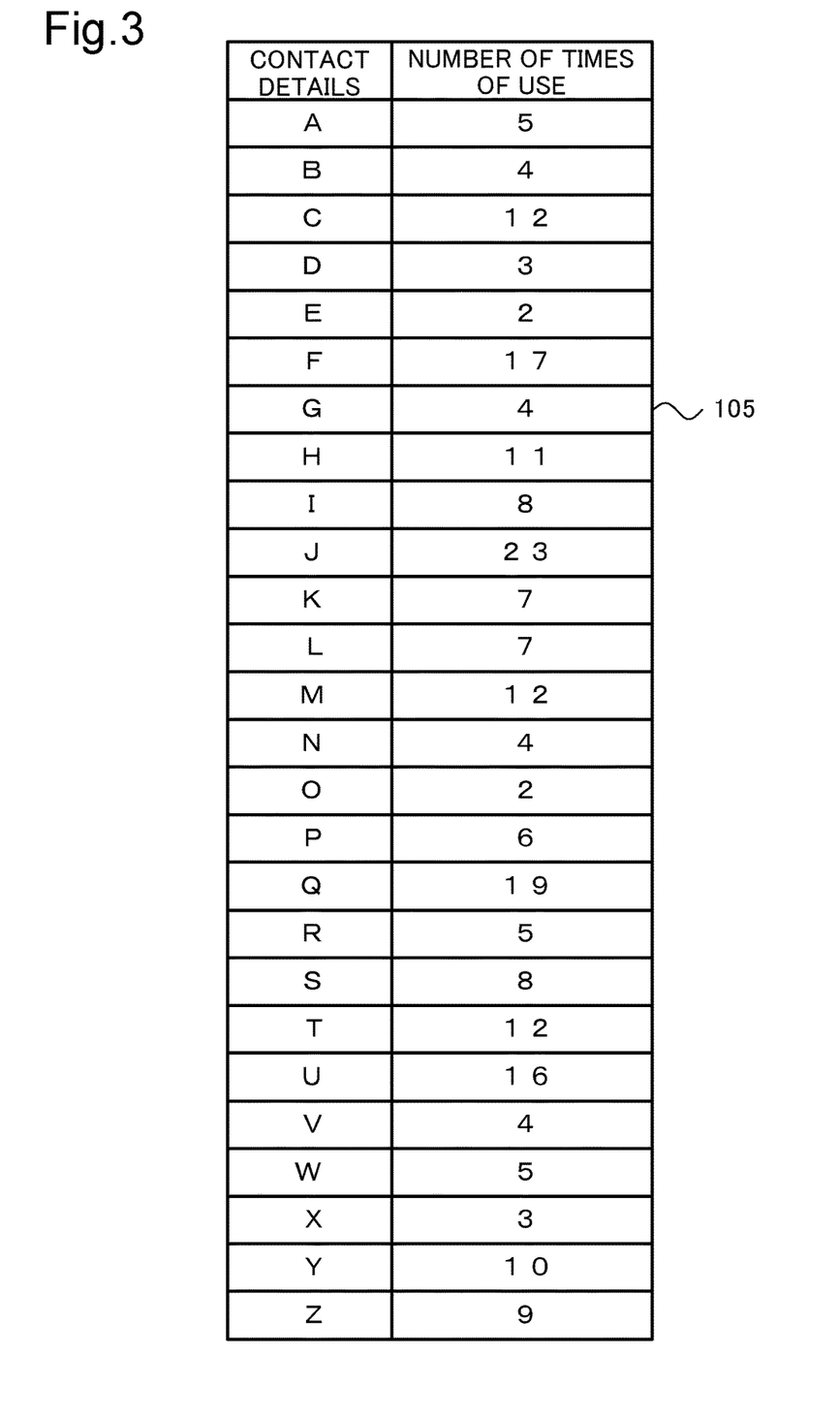
FIG. 3 is a diagram illustrating one example of data configuration of a use information storage section.

The use information storage section 105 stores use information indicating use frequencies respectively corresponding to the plurality of pieces of contact information. FIG. 3 is a diagram illustrating one example of data configuration of the use information storage section 105, storing a number of times of use in correspondence with the respective contact details.

Figure 4:
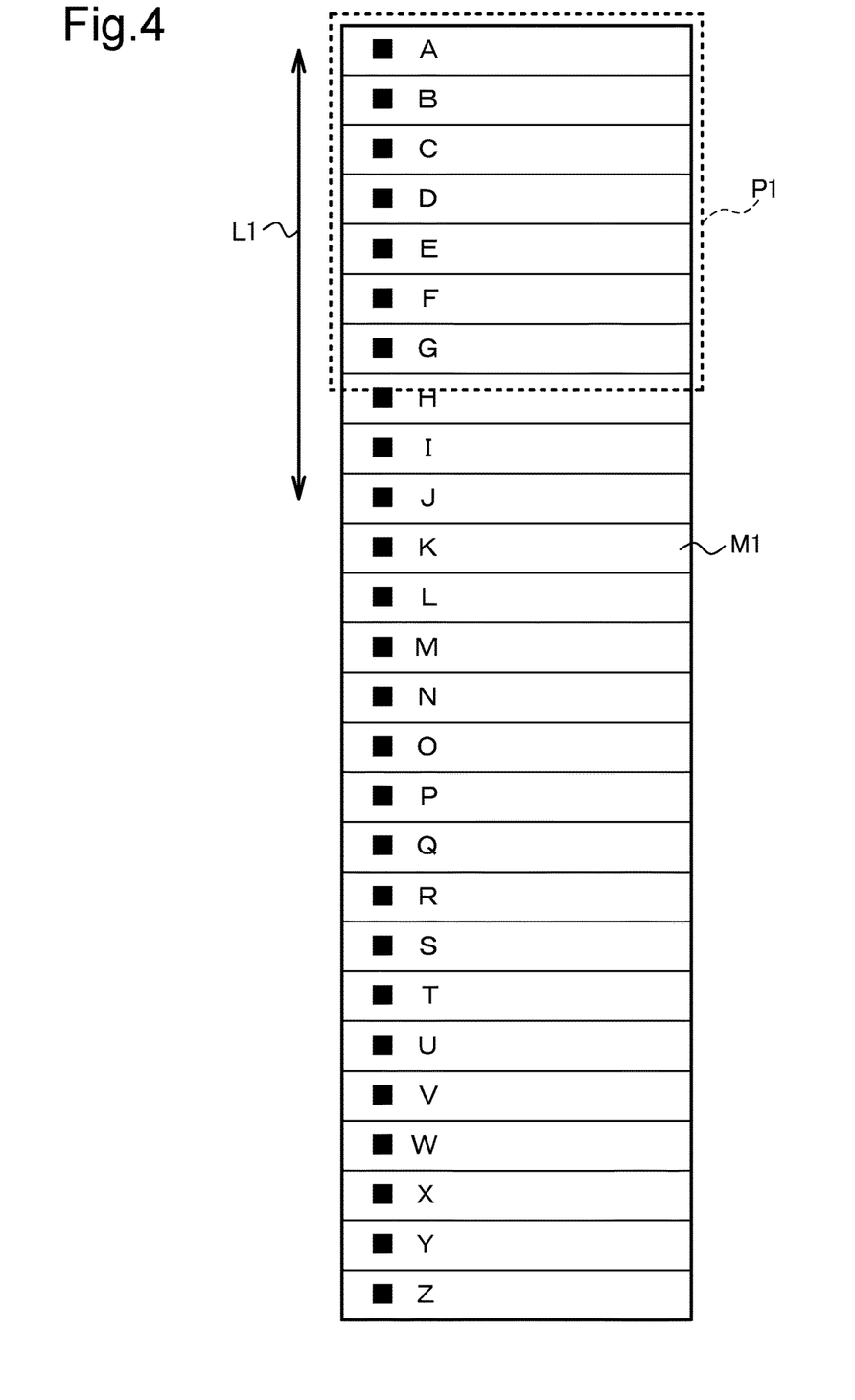
FIG. 4 is a diagram illustrating one example of a list.
Figure 5:
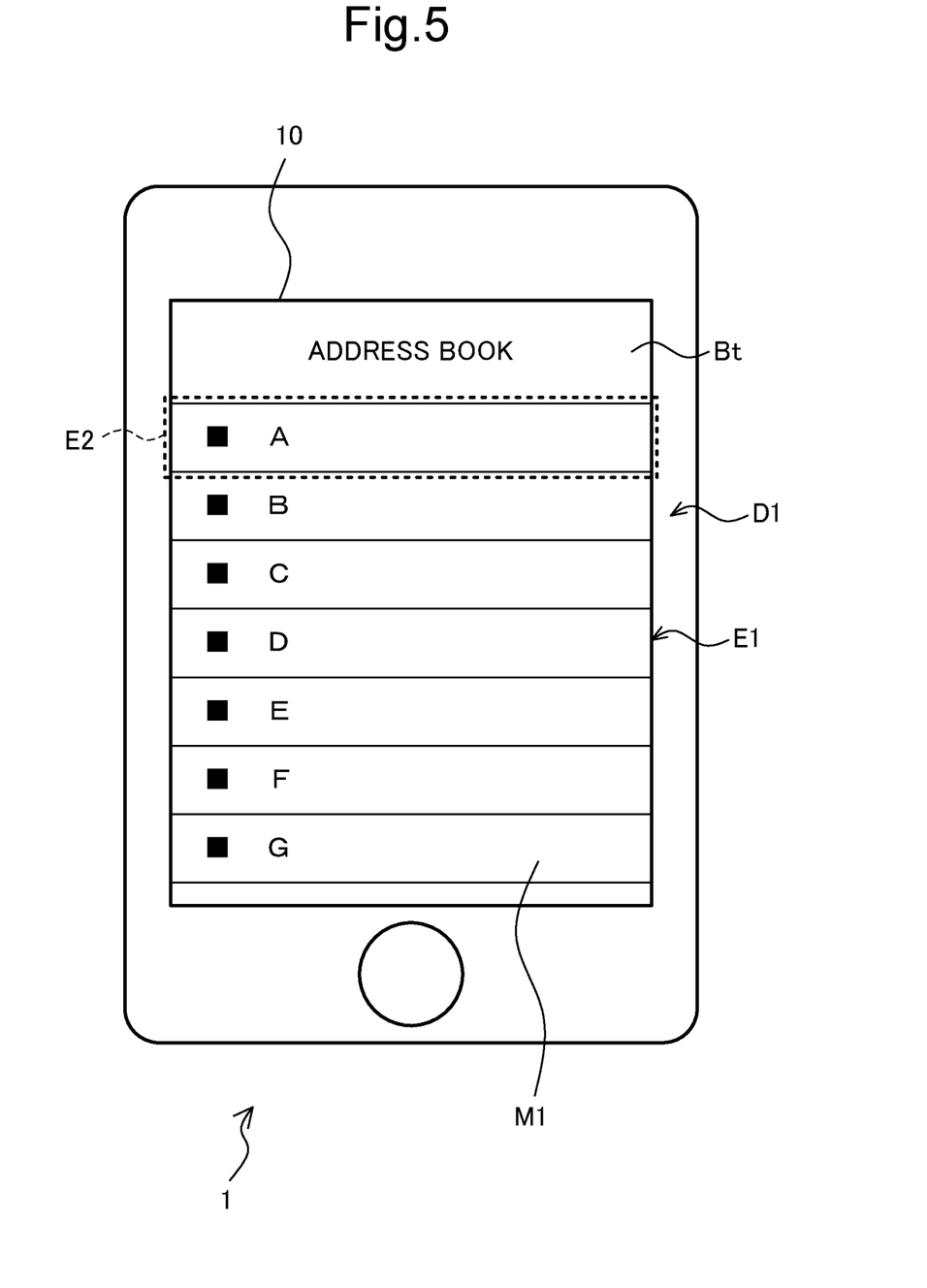
FIG. 5 is a diagram illustrating one example of a display screen displayed at a display section.

FIG. 4 is a diagram illustrating one example of the list. FIG. 5 is a diagram illustrating one example of the display screen displayed at the display section 10. Note that a display target image, that the display control section 103 allows the display section 10 to display as a display target for scroll display, is referred to as a scroll image in this embodiment. That is, the scroll image is an image whole of which cannot be displayed in a display region of the display section 10 through one display trial and whole of which cannot be displayed in the display region unless different portions thereof are sequentially displayed in the display region through the scroll display. In a case where a number of pieces of contact information is large and a list M1 cannot be stored within a display region E1 of the display section 10, the list M1 is a scroll image. A display screen D1 is configured to include a title bar Bt which displays a title name "Address book" and the display region E1 where scroll display of the list M1 is performed.

What is displayed in the display region E1 illustrated in FIG. 5 is a portion P1 illustrated by a broken line in FIG. 4 with a display of the pieces of information of the contact details from "A" to "G". A portion illustrated by a broken line in FIG. 5 is a display region E2 as a predefined position. The display region E2 corresponds to an uppermost part of the display region E1 in FIG. 5, and an example is illustrated here in which an image portion illustrating the information of the contact details "A" is displayed.

The use information update section 106 counts up the number of times of use for the relevant contact details upon every mail transmission or telephone number transmission by the control section 101 to thereby update the use information stored in the use information storage section 105. For example, upon mail transmission to a mail address of the contact details "A" or upon transmission of the telephone number of the contact details "A", the use information update section 106 counts up the use information indicating the number of times of use in correspondence with the contact details "A" stored in the use information storage section 105 (FIG. 3) to perform update from "5" to "6".

Figure 6:
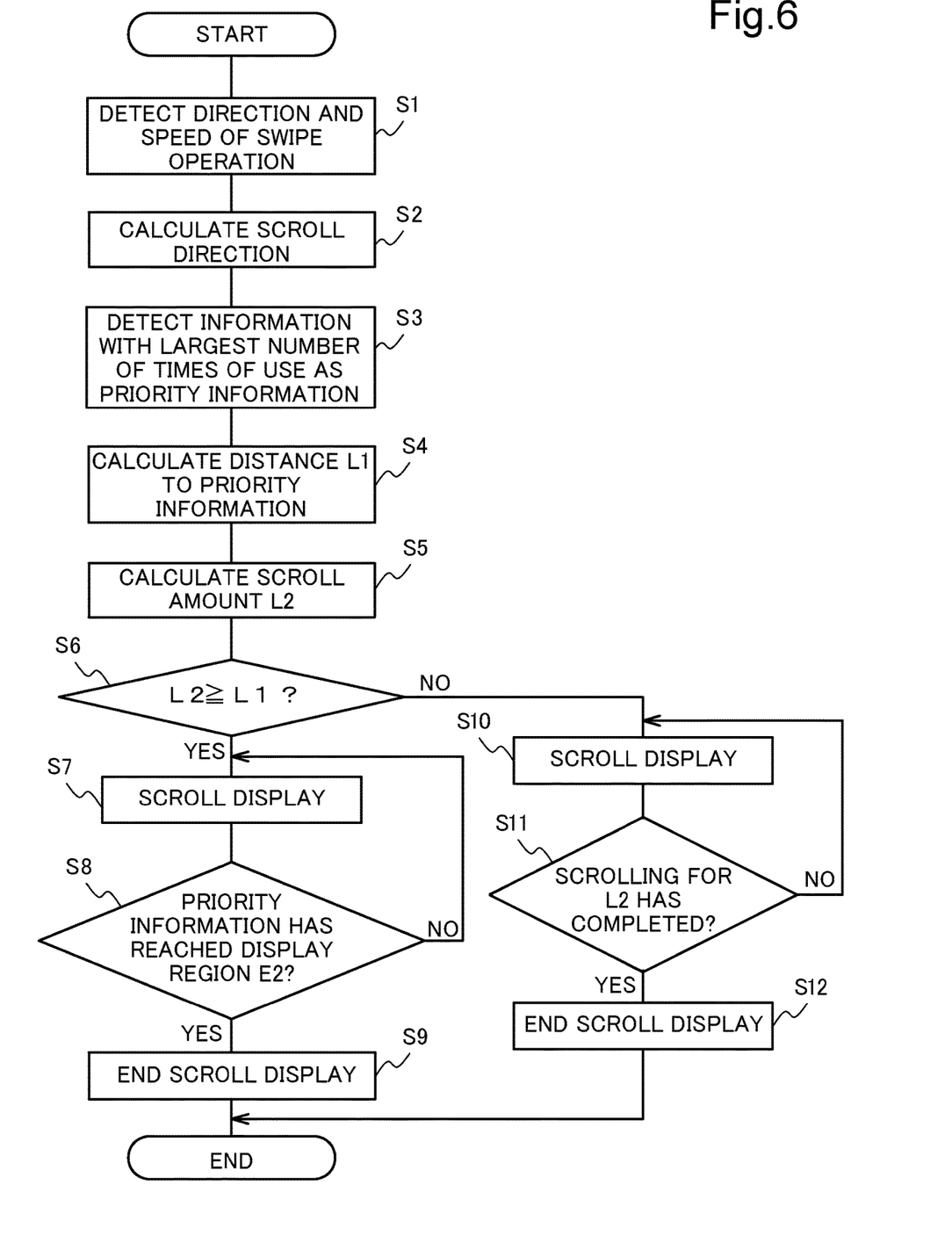
FIG. 6 is a flowchart illustrating display processing performed by the display device according to the first embodiment.

Next, display processing performed by the display device 1 will be described. FIG. 6 is a flowchart illustrating the display processing performed by the display device 1 according to the first embodiment. Note that the description here will be given, referring to, as an example, a case where swipe operation is performed on the list M1 while the list M1 is displayed as the scroll image at the display section 10 (FIG. 5).

Upon reception of an scroll instruction based on the swipe operation performed on the list M1, the operation reception section 102 detects a direction and a speed of the received swipe operation (S1), calculates a scroll direction based on the detected direction of the swipe operation (S2), and outputs the direction to the display control section 103.

Based on the use information stored in the use information storage section 105, the display control section 103 detects, as priority information A1, the information with the highest use frequency out of the pieces of information listed in the calculated scroll direction from a scroll display start position in the list M1 (S3). For example, upon start of the scroll display through scroll-up with an image portion indicating the contact details "A" located at a scroll start position, the display control section 103 detects, as the priority information A1, the information of the contact details "J" with the highest use frequency having the number of times of use corresponding to "23 times", as illustrated in FIG. 3.

Subsequently, the display control section 103 calculates a distance L1 (FIG. 4) from the display region E2 of the display section 10 to the priority information A1 (an image portion indicating the information of the contact details "J") (S4), and based on the direction and speed of the swipe operation detected in S1 above, the display control section 103 also calculates a scroll amount L2 (S5). The display control section 103 further determines whether or not the scroll amount L2 is equal to or greater than the distance L1 (S6).

Figure 7A:
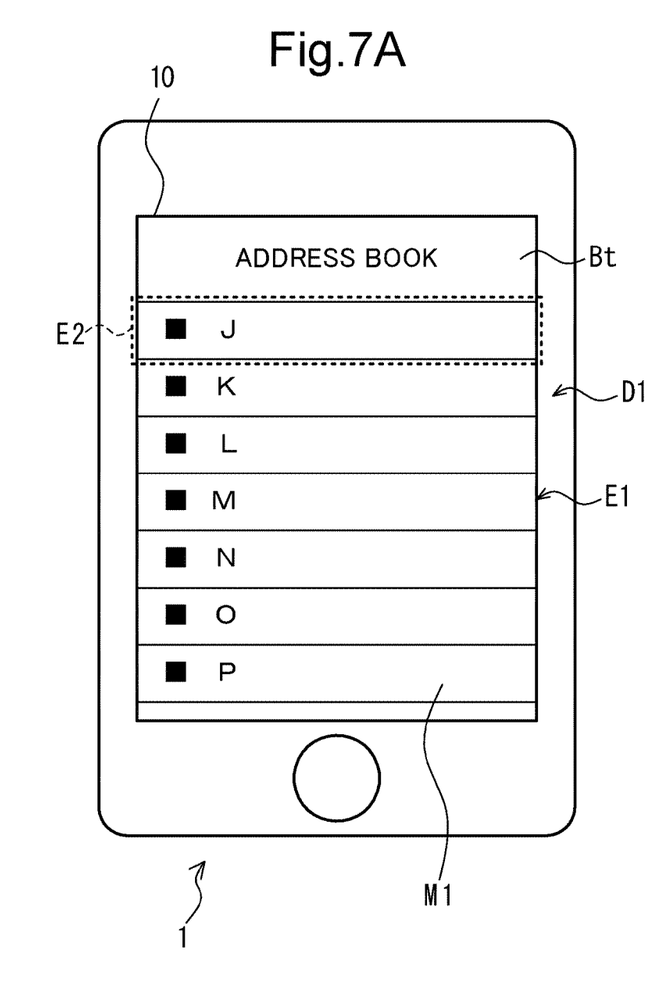
FIGS. 7A and 7B are diagrams each illustrating one example of the display screen displayed at the display section.

Upon determination that the scroll amount L2 is equal to or greater than the distance L1 (that is, it is possible to display the priority information A1 in the display region E2 through the scroll display currently performed) (YES in S6), the display control section 103 performs scroll-display of the list M1 in the scroll direction calculated in S2 (S7). After start of the scroll display, the display control section 103 determines whether or not an image indicating the priority information A1 has been displayed in the display region E2, that is, whether or not the priority information A1 has reached the display region E2 (S8), and upon determination that the priority information A1 has reached the display region E2 (YES in S8), the display control section 103 ends the scroll display while displaying the image indicating the priority information A1 (an image portion indicating the information of the contact details "J" here) in the display region E2, as illustrated in an example of FIG. 7A (S9).

Figure 7B:
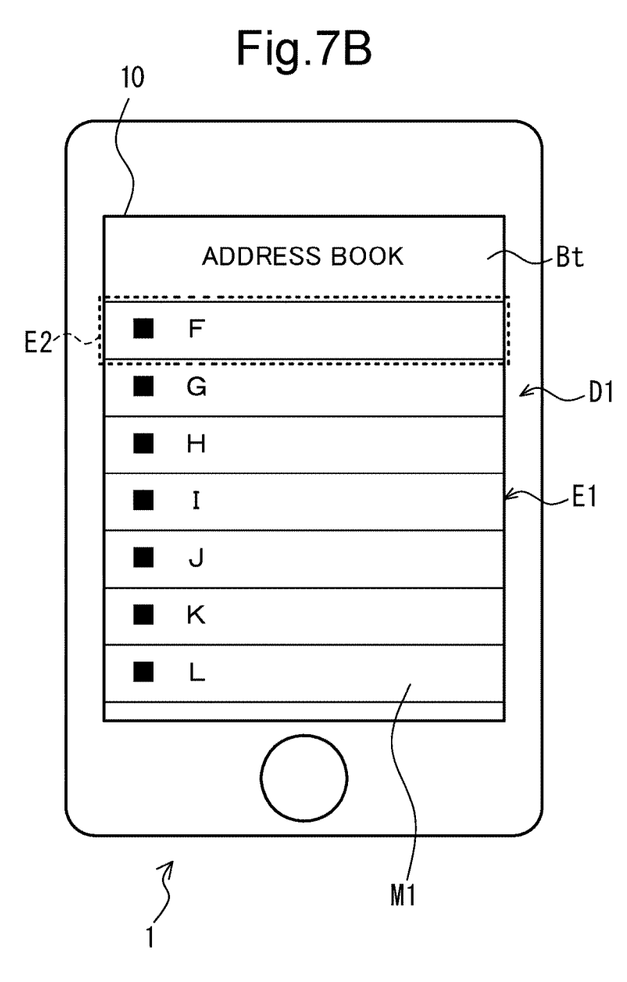

Upon further reception of a scroll instruction (scroll-down instruction) based on new swipe operation performed in a downward direction from the aforementioned display state (S9) by the operation reception section 102, the display control section 103 detects, as new priority information A1, the information of the contact details "F" with the highest use frequency (the number of times of use corresponding to "17 times") in an upward direction, and when the scroll amount L2 is equal to or greater than the distance L1 (YES in S6), the display control section 103 ends the scroll display while displaying the information of the contact details "F" as the priority information A1 in the display region E2, as illustrated in FIG. 7B (YES in S7 and S8, S9).

Note that the display control section 103 may set the scroll speed constant during the scroll display or may provide display so that the speed is gradually decelerated to reach just 0 at time of ending of the scroll display. Moreover, upon display of the scroll display in a manner such as to achieve a speed of 0 at the time of ending of the scroll display as described above, the ending of the scroll display can be stressed for the user, making it easy for the user to view the priority information A1.

Figure 8A:
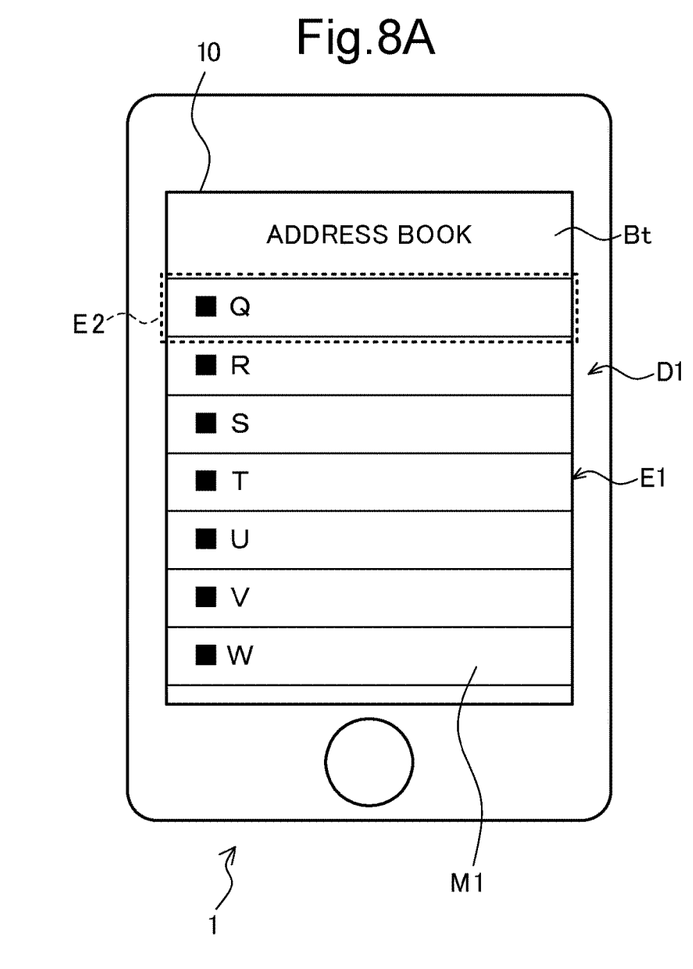
FIGS. 8A and 8B are diagrams each illustrating one example of the display screen displayed at the display section.

Moreover, upon further reception of a scroll instruction (scroll-up instruction) based on new swipe operation performed in an upward direction by the operation reception section 102 after S9, the display control section 103 detects, as new priority information A1, the information of the contact details "Q" with the highest use frequency (the number of times of use corresponding to "19 times") in a downward direction, and when the scroll amount L2 is equal to or greater than the distance L1 (YES in S6), the display control section 103 ends the scroll display while displaying the information of the contact details "Q" as the priority information A1 in the display region E2, as illustrated in the example of FIG. 8A (YES in S7 and S8, S9).

On the other hand, upon determination that the scroll amount L2 is not equal to or greater than the distance L1 (that is, the priority information A1 cannot be displayed in the display region E2 in the scroll display currently performed (NO in S6), the display control section 103 performs scroll display of the list M1 in the scroll direction calculated in S2. After start of the scroll display, the display control section 103 determines whether or not scroll display for the scroll amount L2 has been performed (S11), and upon determination that the scroll display for the scroll amount L2 has been performed (YES in S11), ends the scroll display (S12).

Figure 8B:
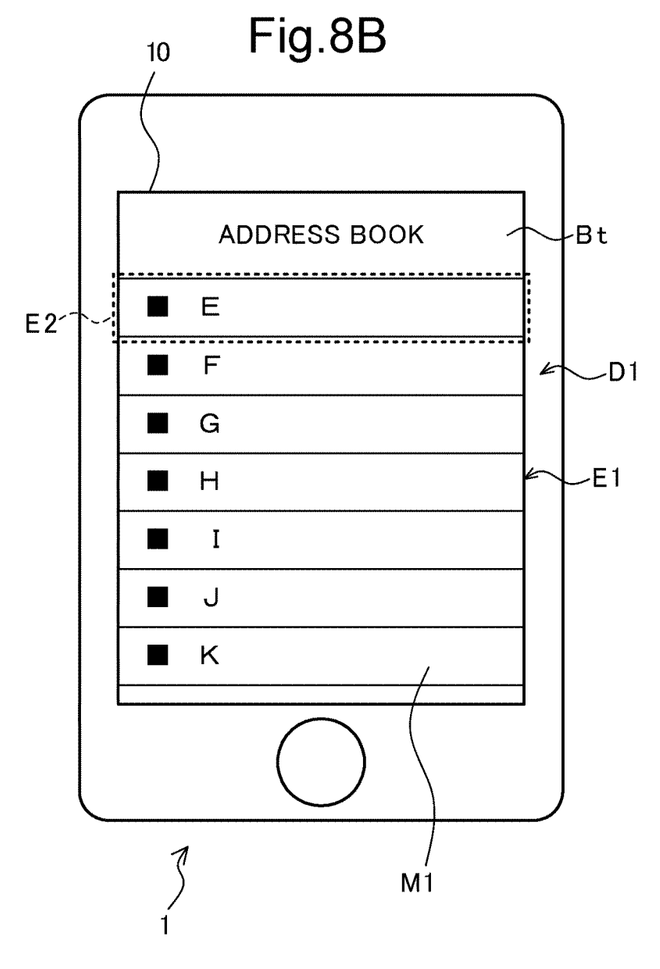

FIG. 8B is a diagram illustrating one example of a state in which the priority information A1 is not displayed in the display region E2, and the information (the information of the contact details "E" here) located above the contact details "J" as the priority information A1 is displayed in the display region E2.

Here, in case of scroll display in a typical display device, a scroll display does not end immediately after separation of the finger from the display screen, thus providing an advantage that operation load on the user is reduced, but the scroll display does not necessarily end at a position desired by the user.

Moreover, the typical display device has been known to increase or reduce a scroll movement distance in proportion to a speed at which scroll operation is performed, but does not end the scroll display at a position desired by the user. Moreover, a technology in the typical display device is known which ends the scroll display at a marked position to thereby end the scroll display at the position desired by the user, which requires previous marking operation performed on a user's side with some labor.

On the contrary, with this embodiment, the information with the highest use frequency (priority information) included in the pieces of information listed in the scroll direction is displayed in the display region E2 as a predefined position in the display region E1 of the display section 10 through the scroll display, and the scroll display ends in this state, thus making it possible to end the scroll display in a state in which the user is assumed to desire to stop the display (a state in which an image indicating the information with the highest use frequency is displayed in the display region E2) without labor required on the user's side.

Note that, in the above, when the scroll amount L2 is equal to or greater than the distance L1, the scroll display is ended after the display of the priority information A1 in the display region E2 (S4 to S9), but upon reception of the scroll instruction by the operation reception section 102, regardless of whether or not the scroll amount L2 is equal to or greater than the distance L1, the display control section 103 may detect the priority information A1 in the scroll direction indicated by the scroll instruction, display the priority information A1 in the display region E2, and end the scroll display.

Figure 9:
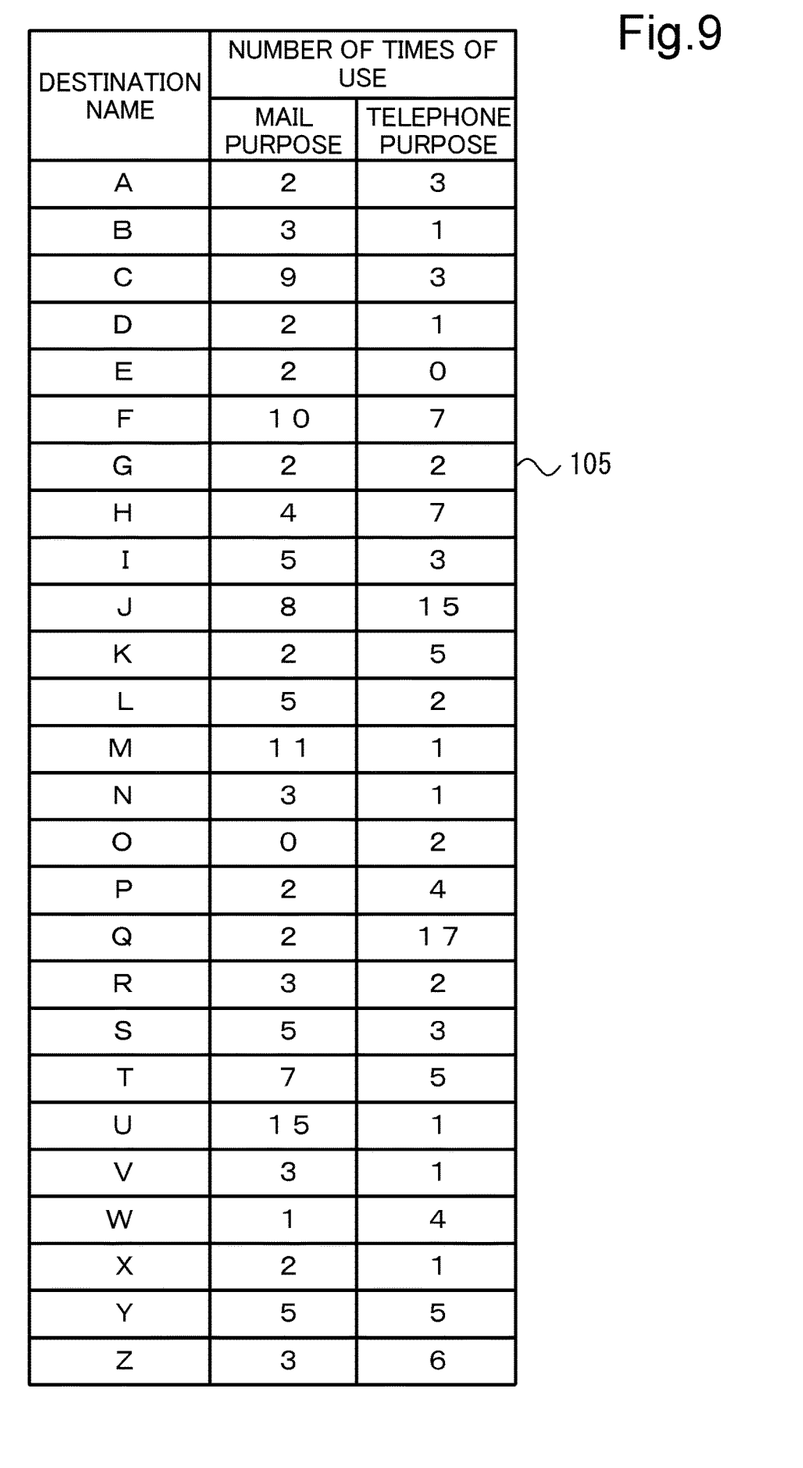
FIG. 9 is a diagram illustrating one example of data configuration of the use information storage section.

Next, a display device according to a second embodiment will be described. FIG. 9 is a diagram illustrating one example of data configuration of the use information storage section 105. In the display device 1 according to the second embodiment 2, the use information storage section 105 stores a number of times of use for each use purpose (mail purpose and telephone purpose) in correspondence with each contact details, as illustrated in FIG. 9.

In the second embodiment, the use information update section 106 counts up the number of times of use for the mail purpose for the relevant contact details every upon mail transmission by the control section 101, and counts up the number of times of use for the telephone purpose for the relevant contact details upon every telephone number transmission by the control section 101 to thereby update the use information storage section 105 on an individual use purpose basis. That is, the use information update section 106 counts up the number of times of use for each attribute information of the list.

For example, referring to FIG. 9 for the description, upon mail transmission to a mail address of the contact details "A", the use information update section 106 counts up the number of times of use for the mail purpose corresponding to the contact details "A" stored in the use information storage section 105 to perform update from "2" to "3", and upon transmission of the telephone number of the contact details "B", the use information update section 106 counts up the number of times of use for the telephone purpose corresponding to the contact details "B" stored in the use information storage section 105 to perform update from "1" to "2".

Figure 10:
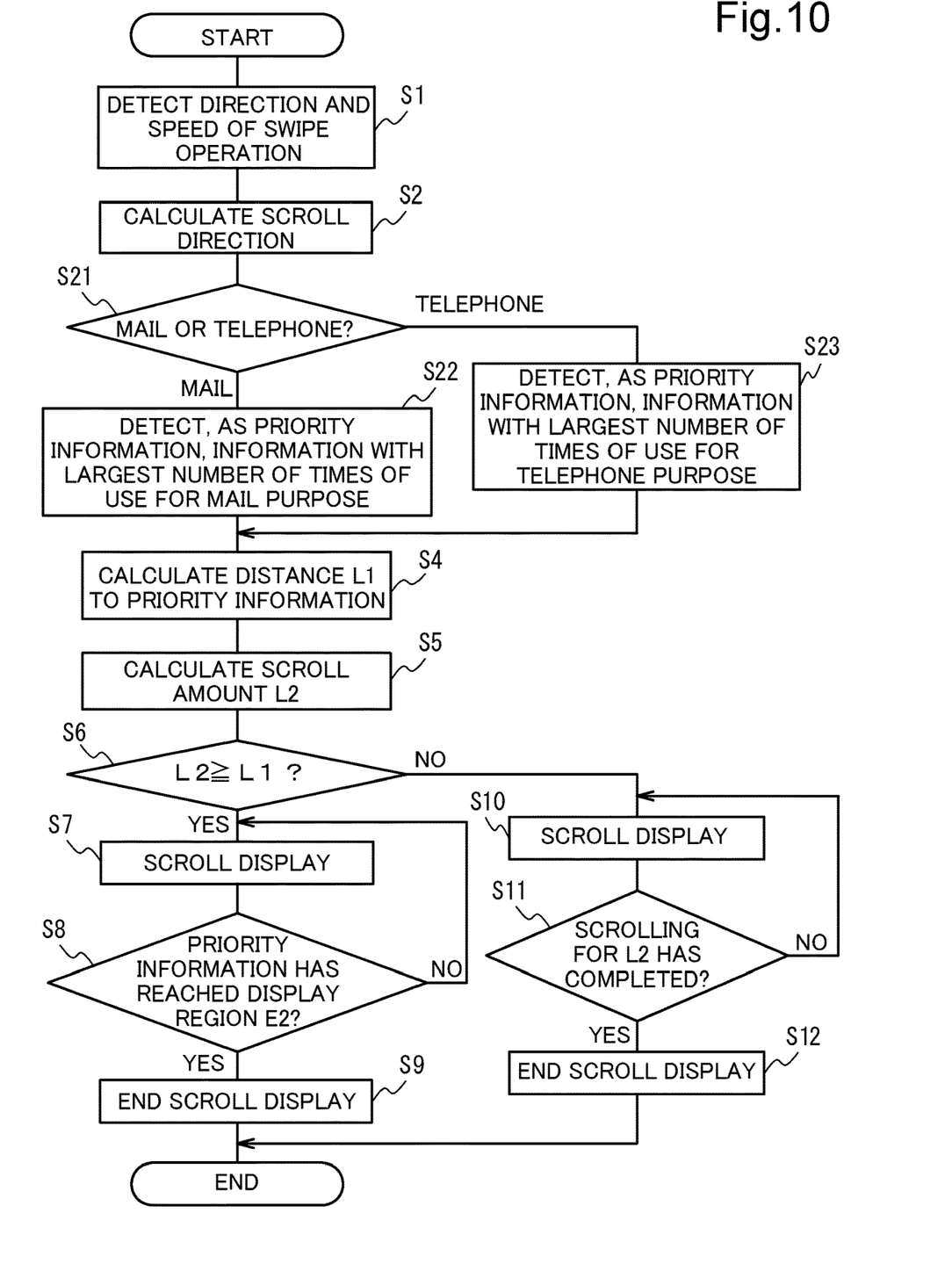
FIG. 10 is a flowchart illustrating display processing performed by a display device according to a second embodiment.

Next, display processing performed by the display device 1 according to the second embodiment will be described. FIG. 10 is a flowchart illustrating the display processing performed by the display device 1 according to the second embodiment. Note that the same processing as that of the first embodiment will be omitted from the description.

In the first embodiment, the priority information A1 is detected without a concept of any use purpose, while the second embodiment differs from the first embodiment in a point that the priority information A1 is detected in association with the use purpose.

In the second embodiment, after the scroll direction is calculated in S2, the display control section 103 determines whether the use information related to the use purpose of the list received together with the address book display instruction from the user by the operation reception section 102 is a mail or a telephone, that is, whether the address book display instruction has been received upon execution of the mail function or the telephone function (S21).

Upon determination that the operation reception section 102 has received the address book display instruction upon the execution of the mail function ("MAIL" in S21), based on the use information for the mail purpose stored in the use information storage section 105, the display control section 103 detects, as the priority information A1, the information with the highest use frequency out of the pieces of information listed in the scroll direction from the scroll display start position in the list M1 (S22). For example, upon scroll display by scroll-up, the display control section 103 detects, as the priority information A1, the information of the contact details "U" indicating the largest number of times of use for the mail purpose (the number of times of use corresponding to "15 times").

On the other hand, upon determination that the operation reception section 102 has received the address book display instruction upon the execution of the telephone function ("TELEPHONE" in S21), based on the use information for the telephone purpose stored in the use information storage section 105, the display control section 103 detects, as the priority information A1, the information with the highest use frequency out of the pieces of information listed in the scroll direction from the scroll display start position in the list M1 (S23). For example, upon scroll display by scroll-up, the display control section 103 detects, as the priority information A1, the information of the contact details "Q" indicating the largest number of times of use for the telephone purpose (the number of times of use corresponding to "17 times").

Subsequently, in the same manner as a manner in which the display processing is performed by the display device 1 according to the first embodiment, processing related to display of the priority information A1 in the display region E1 is performed as described above.

According to the second embodiment, the information with the highest use frequency is detected as the priority information A1 in association with the use purpose, thus making it possible to end the scroll display in a state in which the user is assumed to further desire to stop the scroll display.

Figure 11:
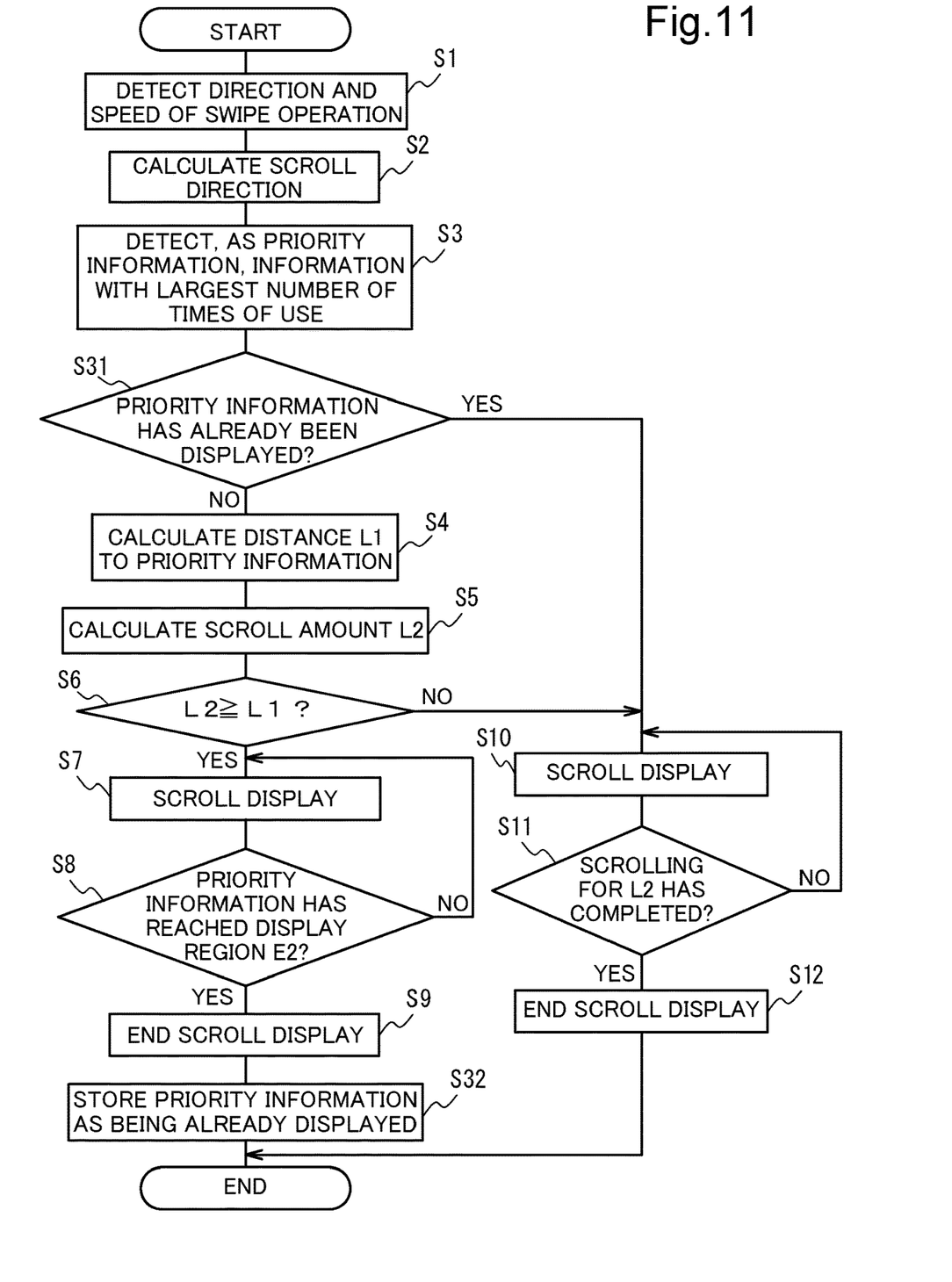
FIG. 11 is a flowchart illustrating display processing performed by a display device according to a third embodiment.

Next, a third embodiment of the display processing performed by the display device 1 will be described. FIG. 11 is a flowchart illustrating the display processing performed by the display device 1 according to the third embodiment. Note that the same processing as that of the first or second embodiment will be omitted from the description.

The third embodiment is different from the first embodiment in a point that, upon the ending of the scroll display while displaying the priority information A1 in the display region E2 as the predefined position described above, the display control section 103 ends the scroll display only once per one piece of the priority information A1 while displaying the one piece of the priority information A1 in the display region E2.

After ending the scroll display (S9), the display control section 103 stores that the priority information A1 has been displayed in the display region E2 (S32).

Moreover, upon detection of the information with the highest use frequency as the priority information A1 (S3), the display control section 103 determines whether or not the detected priority information A1 is stored as being already displayed in the display region E1 (S31). Upon determination that the detected priority information A1 is not stored as being already displayed (NO in S31), the display control section 103 proceeds to S4, and upon determination that the detected priority information A1 is stored as being already displayed (YES in S31), the display control section 103 proceeds to S10 (that is, the display control section 103 performs normal scroll display in accordance with a scroll amount specified by the scroll instruction without performing the aforementioned processing for ending the scroll display while displaying the priority information A1 in the display region E2).

According to the third embodiment, since the display of the one piece of the priority information A1 in the display region E1 is not performed twice, after the priority information A1 is displayed in the display region E1, the user can repeat the scroll instruction to thereby perform the normal scroll display in accordance with the scroll amount specified by the scroll instruction.

As still another embodiment, in accordance with intensity of the swipe operation received by the operation reception section 102, for example, the swipe speed, the display control section 103 may determine whether or not to perform the aforementioned processing of ending the scroll display while displaying the priority information A1 in the display region E2. For example, in a case where the speed of the swipe operation is equal to or greater than a predefined speed, the display control section 103 may perform the aforementioned processing of ending the scroll display while displaying the priority information A1 in the display region E2, and in a case where the speed of the swipe operation is smaller than the predefined speed, the display control section 103 may perform normal scroll display in accordance with the scroll amount specified by the scroll instruction.

This disclosure is not limited to the aforementioned embodiments and configuration and thus various modifications thereto can be made. For example, the aforementioned embodiments have been described referring to, as an example, a case where the scroll is achieved through vertical scroll, but this disclosure is not limited thereto, and a technical idea of this disclosure indicated as the aforementioned embodiments is also applicable to a case where horizontal scroll is performed.

Moreover, the aforementioned embodiments have been described, referring to a smartphone as one embodiment of the display device according to this disclosure, which is just one example, and another electronic device, for example, any of a portable phone, a PDA, a music player, and an electronic table may be used. Moreover, the list may be not only a list of contact details but may also be, for example, a book mark listing addresses of favorite web pages.

Moreover, the aforementioned configuration and processing indicated by the embodiments with reference to FIGS. 1 to 11 are just one embodiment of this disclosure, and this disclosure is not limited to these configuration and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display device comprising:
    a display section including a touch panel function;
    a storage section storing a list and use information, the list being where a plurality of pieces of information to be used for a predefined plurality of use purposes is listed, and the use information indicating, for the plurality of pieces of information, respectively, a use frequency for each of the plurality of use purposes; and
    a control unit including a processor and, as a result of performing operation in accordance with an operation program by the processor, functioning as a display control section,
    the display control section being configured to:
    (i) by the touch panel function, upon reception of a display instruction of the list and also a use purpose of the list, allow the display section to display in a display region a portion of the plurality of pieces of information listed in the list;
    (ii) while the portion of the plurality of pieces of information is being displayed on the display section, by the touch panel function, upon reception of a scroll instruction for scroll displaying the list in the direction in which the plurality of pieces of information is listed, detect, in the list, as priority information, information that is being indicated by the use information as highest in the use frequency with respect to the received use purpose of the list, out of the plurality of pieces of information listed in the scroll direction specified by the scroll instruction from a start position of the scroll display;
    (iii) allow the display section to scroll display the list in the scroll direction, and to end the scroll display when the priority information becomes a state of being displayed at a predefined position in the display region of the display section; and
    (iv) allow the storage section to store already-displayed information indicating the priority information, displayed at the predefined position,
    wherein when the already-displayed information indicating the priority information detected at the processing of (ii) is not stored in the storage section, the display control section performs the processing of (iii) and the processing of (iv), and when the already-displayed information indicating the priority information detected at the processing of (ii) is stored in the storage section, the display control section allows the display section to scroll display the list in the scroll direction in accordance with the scroll amount specified by the scroll instruction without performing the processing of (iii) and the processing of (iv).

2. The display device according to claim 1, wherein the control unit performs the scroll display in a manner such as to gradually decelerate a scroll speed during the scroll display so that the scroll speed reaches 0 upon the ending of the scroll display.

3. The display device according to claim 1, wherein the predefined position is located at an uppermost part of the display region.

4. The display device according to claim 1, wherein in a case where the touch operation detected by the touch panel function is either of swipe operation and flick operation and the control unit receives, while the portion of the plurality of pieces of information is being displayed on the display section, the scroll instruction based on either of the swipe operation and the flick operation,
the control unit:
performs the processing of (iii) and the processing of (iv) when a speed of either of the swipe operation and the flick operation is equal to or greater than a predefined speed, and
allows the display section to scroll display the list in the scroll direction in accordance with a scroll amount specified by the scroll instruction without performing the processing of (iii) and the processing of (iv) when the speed of either of the swipe operation and the flick operation is smaller than the predefined speed.

5. The display device according to claim 4, wherein upon reception of the scroll instruction based on either of the swipe operation and the flick operation, the control unit calculates a distance L1 from the predefined position to the priority information, and also calculates a scroll amount L2 based on the speed of either of the swipe and the flick operation, and
upon determination that the scroll amount L2 is equal to or greater than the distance L1 the control unit performs the processing of (iii) and the processing of (iv) and upon determination that the scroll amount L2 is not equal to or greater than the distance L1, the control unit allows the display section to scroll display the list in the scroll direction in accordance with the scroll amount specified by the scroll instruction without performing the processing of (iii) and the processing of (iv).

6. The display device according to claim 1, wherein the list is where a plurality of pieces of contact information being as the information is listed, the contact information including a telephone number and a mail address.

7. The display device according to claim 6, wherein the use information includes a number of times of use for the telephone number and a number of times of use for the mail address.

8. A computer-readable non-transitory recording medium recording a display control program causing a computer that includes a display section including a touch panel function, a storage section storing a list and use information, the list being where a plurality of pieces of information to be used for a predetermined plurality of use purposes is listed, and the use information indicating, for the plurality of pieces of information, respectively, a use frequency for each of the plurality of use purposes to function so as to:
(i) by the touch panel function, upon reception of a display instruction of the list and also a use purpose of the list, allow the display section to display in a display region a portion of the plurality of pieces of information listed in the list;
(ii) while the portion of the plurality of pieces of information is being displayed on the display section, by the touch panel function, upon reception of a scroll instruction for scroll displaying the list in the direction in which the plurality of pieces of information is listed, detect, in the list, as priority information, information that is being indicated by the use information as highest in the use frequency with respect to the received use purpose of the list, out of the plurality of pieces of information listed in the scroll direction specified by the scroll instruction from a start position of the scroll display;
(iii) allow the display section to scroll display the list in the scroll direction, and to end the scroll display when the priority information becomes a state of being displayed at a predefined position in the display region of the display section; and
(iv) allow the storage section to store already-displayed information indicating the priority information, displayed at the predefined position,
wherein the display control program further causes the computer to function so that when the already-displayed information indicating the priority information detected at the processing of (ii) is not stored in the storage section, the display control section performs the processing of (iii) and the processing of (iv), and when the already-displayed information indicating the priority information detected at the processing of (ii) is stored in the storage section, the display control section allows the display section to scroll display the list in the scroll direction in accordance with the scroll amount specified by the scroll instruction without performing the processing of (iii) and the processing of (iv).

* * * * *